Patented July 20, 1937

2,087,525

UNITED STATES PATENT OFFICE 2,087,525

TREATMENT OF HYDROCARBON OILS

Jacque C. Morrell and Gustav Egloff, Chicago, Ill., assignors, by mesne assignments, to Universal Oil Products Company, Chicago, Ill., a corporation of Delaware No Drawing. Continuation of application Serial No. 516,276, February 16, 1931. This application January 2, 1934, Serial No. 705,030. Renewed November 6, 1936

8 Claims. (Cl. 196—36)

This application is a continuation of Serial No. 516,276, filed February 16, 1931.

This invention relates to the treatment of hydrocarbon oils and refers more particularly to the refining of relatively low boiling hydrocarbon distillates at elevated temperatures, especially those resulting from the conversion of relatively high boiling hydrocarbons at elevated temperatures.

More particularly the invention comprises subjecting hydrocarbon oil vapors to treatment with hydrochloric acid or mixtures of hydrochloric acid and steam in the presence of active earths such as fuller's earth, activated clays and the like. The hydrochloric acid is introduced either as an aqueous solution of varying concentration or hydrogen chloride gas together with steam. It is specifically pointed out that the presence of a small amount of water or water vapor is considered necessary together with hydrogen chloride or hydrochloric acid gas in the process. The distinction between hydrochloric acid gas and hydrochloric acid is that the latter is an aqueous solution of the gas. Oxygen containing gases such as air, oxygen, ozone or ozonized air may also be introduced during the treatment.

The invention is more particularly directed to the treatment of vapors of lower boiling cracked distillates though straight run distillates may also be treated within the scope of the invention.

In applying the process of the invention to practice any suitable equipment may be employed which will permit the contacting of the hydrocarbon vapors and the treating materials employed with the solid contacting materials, for example, a suitable tower or chamber packed with a selected mixture of contact materials may be employed following the fractionator of a cracking system, the hydrochloric acid being introduced at a suitable point or points along the line of flow of the ascending or descending vapors, thus permitting contact with the solid materials of the mixture of hydrocarbon oil vapors and the gaseous and liquid treating materials. Similarly, any device which permits the efficient contacting of the hydrocarbon vapors undergoing treatment with the gases, liquids and solids may be employed. The solid contacting materials may sometimes be employed in successive strata of varying composition.

It has been found desirable to neutralize the vapors before or after condensation and to this end the vapors may be treated with ammonia gas or pass counterflow to solutions of alkalis in auxiliary neutralizing equipment or the condensed vapors may be treated with liquid alkalis such as solutions of caustic soda, ammonia or the like, the traces of reagents and reaction products remaining being washed out with water when found necessary.

The effect of the reagents used within the scope of the invention, to-wit, hydrochloric acid, oxidizing gases and steam, upon hydrocarbon vapors is of a complicated nature from a chemical standpoint but the results obtained are definite and frequently have been found to show distinct advantages over other methods of treatment. The net results are the removal of certain highly unsaturated hydrocarbons by polymerization reactions, with the formation of some high molecular weight chlorine derivatives which are too heavy to pass along with the treated vapors and may be removed from the system as a heavy polymer reflux. By varying the proportions of the treating materials used, the degree of reaction may be varied to effect greater or lesser changes in the character of the vapors treated. While the most outstanding feature is the polymerization of unsaturated hydrocarbons, reductions in sulphur content have also been observed.

Various temperatures of treatment may be employed, for example, from 250–600° F., more or less, and the pressures may be subatmospheric, atmospheric, or superatmospheric. While the results may vary with the temperatures employed, the pressures and temperatures are chosen so that the hydrocarbons are treated substantially in the vapor phase. It is preferable that the hydrocarbons undergoing treatment are substantially of gasoline boiling range. Vapors direct from a cracking process may be treated.

As specific examples of the operation of the process of the invention and of the results obtained, a California cracked distillate of approximately motor fuel boiling range may be vaporized and subjected to treatment with hydrochloric acid during the passage of the vapors through a stationary mass of fuller's earth in a downward direction. The hydrochloric acid may be used in an amount equivalent to approximately 2½ pounds per barrel of oil treated with oxygen in an amount equal to half that required to react with the hydrogen in the hydrochloric acid. Steam is used at the rate of approximately 2 pounds per barrel. The untreated product may show a gum content of approximately 500 mgs. per 100 ccs. and have a reddish-brown color, with a sulphur content of approximately 0.45%.

The treated product after suitable separation from spent reagents, neutralizing with alkalis and washing with water may show a gum content of approximately 30 mgs. and a color of 25 on the Saybolt scale. The sulphur content may be found to be as low as 0.2%.

In the case of a mixed Mid-Continent and West Texas cracked distillate treated with approximately the same amounts of reagents, the gum content may be reduced from 350 to 15 mgs. and the color raised from a light amber to approximately 25 on the Saybolt scale. The sulphur content may be reduced from 0.45% to approximately 0.2%.

The introduction of oxygen is helpful where desulphurization is required.

The process of the invention is particularly suitable to the treatment of cracked distillates produced from California oils. In some cases the untreated distillates may contain 550 mgs. of gum and have a reddish color while the treated distillates may have a gum content of only 30 mgs. and a color of 25 to 30 on the Saybolt scale. The sulphur content may be reduced from 0.5% to 0.2%.

The foregoing description and examples have disclosed a process applicable to the treatment of hydrocarbon oil vapors which has a wide applicability and is capable of great variations in the methods of operation and the amounts of reagents employed. Therefore the specific cases cited are not to be construed in a limiting sense upon the broad scope of the invention as many other modifications and examples can be given.

We claim as our invention:

1. A step in the process of refining a product of motor fuel boiling range resulting from the cracking of a hydrocarbon oil which comprises subjecting said product in heated vaporous condition to the action of hydrochloric acid solution and added steam and free oxygen in the presence of active clay.

2. A step in the process of refining a product resulting from the cracking of a hydrocarbon oil which comprises subjecting said product in heated vaporous condition to the action of hydrochloric acid solution and added steam and free oxygen in the presence of active clay.

3. A step in the process of refining a product of motor fuel boiling range resulting from the cracking of a hydrocarbon oil which comprises subjecting said product in heated vaporous condition to the action of aqueous hydrochloric acid and free oxygen in the presence of active clay.

4. A step in the process of refining a product resulting from the cracking of a hydrocarbon oil which comprises subjecting said product in heated vaporous condition to the action of aqueous hydrochloric acid and free oxygen in the presence of active clay.

5. A step in the process of refining a product resulting from the cracking of a hydrocarbon oil which comprises subjecting said product in heated vaporous condition to the action of aqueous hydrochloric acid and free oxygen in the presence of fuller's earth.

6. A step in the refining of the overhead product of substantially motor fuel boiling range resulting from the cracking of hydrocarbon oil which comprises subjecting said product in heated vaporous condition to the action of aqueous hydrochloric acid and free oxygen in the presence of fuller's earth.

7. A step in the refining of low-boiling hydrocarbon distillates which comprises subjecting the distillate in heated vaporous condition to the action of hydrochloric acid solution and added steam and free oxygen in the presence of active clay.

8. A step in the refining of low-boiling hydrocarbon distillates which comprises subjecting the distillate in heated vaporous condition to the action of aqueous hydrochloric acid and added steam and free oxygen in the presence of active clay.

JACQUE C. MORRELL.
GUSTAV EGLOFF.